United States Patent [19]

Menen

[11] 4,407,169
[45] Oct. 4, 1983

[54] COUNTERWEIGHT SYSTEM FOR POSITIVE DISPLACEMENT PISTON TYPE DEVICE

[76] Inventor: Balan R. Menen, 529 N. Hart, Orange, Calif. 91101

[21] Appl. No.: 354,068

[22] Filed: Mar. 2, 1982

Related U.S. Application Data

[63] Continuation of Ser. No. 98,702, Nov. 29, 1979, abandoned.

[51] Int. Cl.³ .............................................. F16F 15/26
[52] U.S. Cl. .................................... 74/604; 123/192 B
[58] Field of Search ............... 74/603, 604; 123/192 B

[56] References Cited

U.S. PATENT DOCUMENTS

| 795,901 | 8/1905 | Dowson | 74/604 |
| 1,310,090 | 7/1919 | Ricardo | 74/604 |
| 2,235,160 | 3/1941 | Ljungstrom | 74/604 |
| 4,152,956 | 5/1979 | Hintle | 74/603 |

FOREIGN PATENT DOCUMENTS 44232 9/1917 Sweden ................................. 74/604

Primary Examiner—Kenneth Dorner
Attorney, Agent, or Firm—Donald D. Mon

[57] ABSTRACT

A piston type positive displacement device includes a crankshaft turned as a consequence of piston reciprocation. A counterweight is provided to balance the cyclical forces generated by the reciprocating piston. The counterweight is linked to the crankshaft, slides in a slideway, and includes a wagging member which wags as it reciprocates. The counterweight surrounds its own bearing so as to reduce the height needed to accommodate the system. It can also provide improved engine smoothness because of a potentially greater movement of inertia.

9 Claims, 21 Drawing Figures

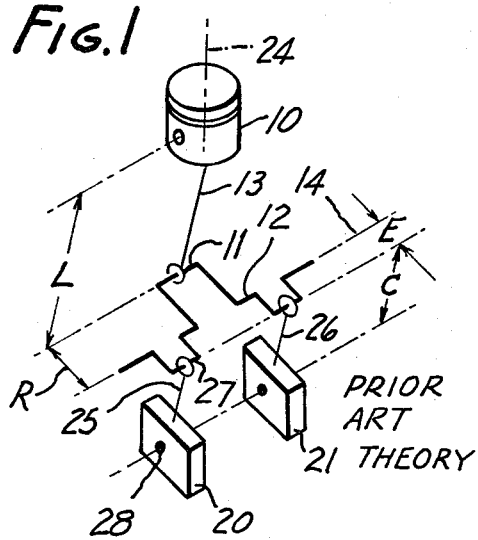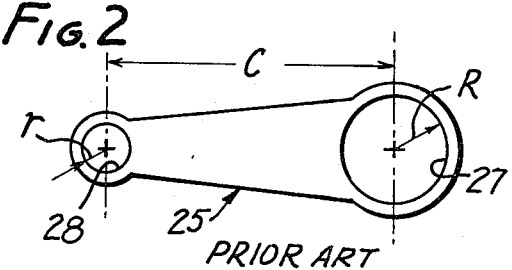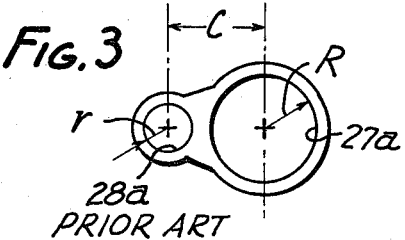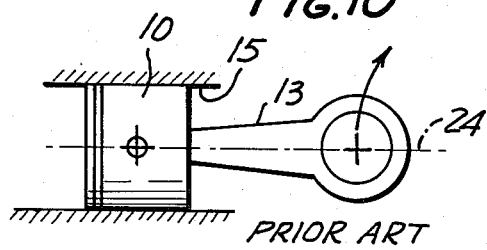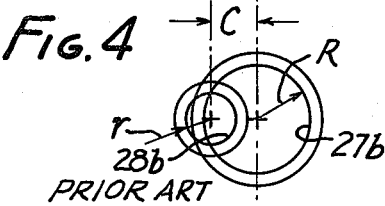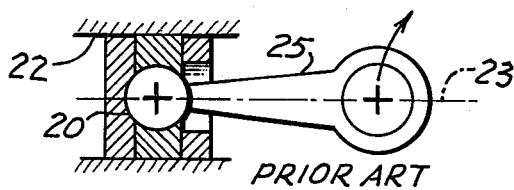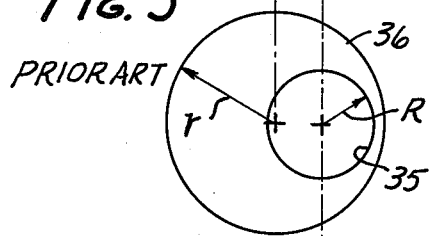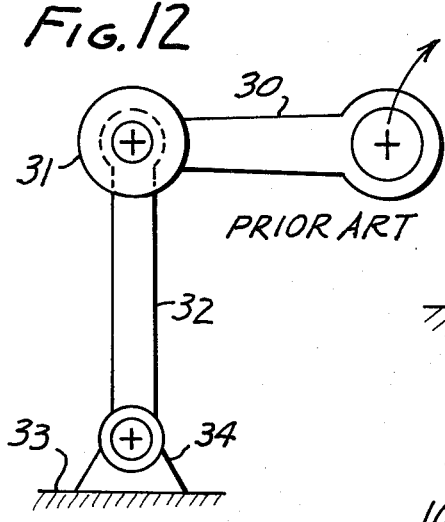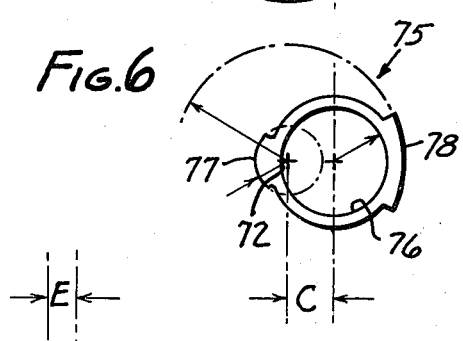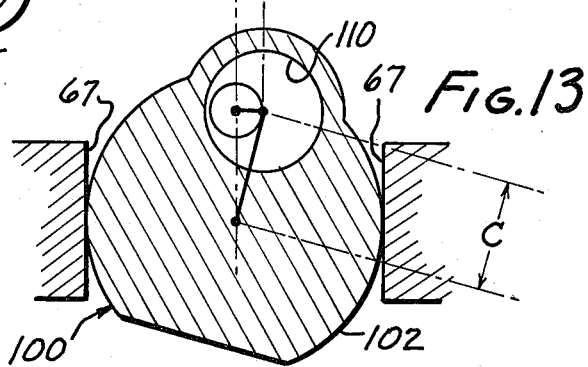

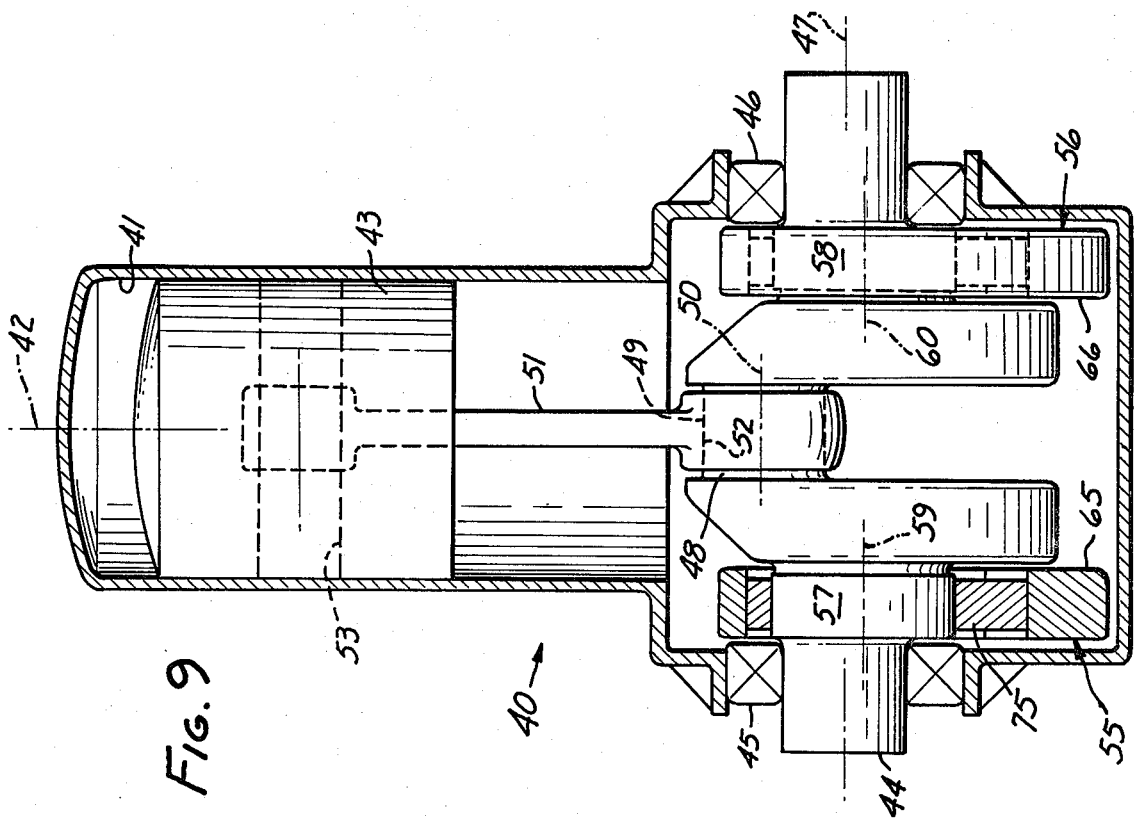
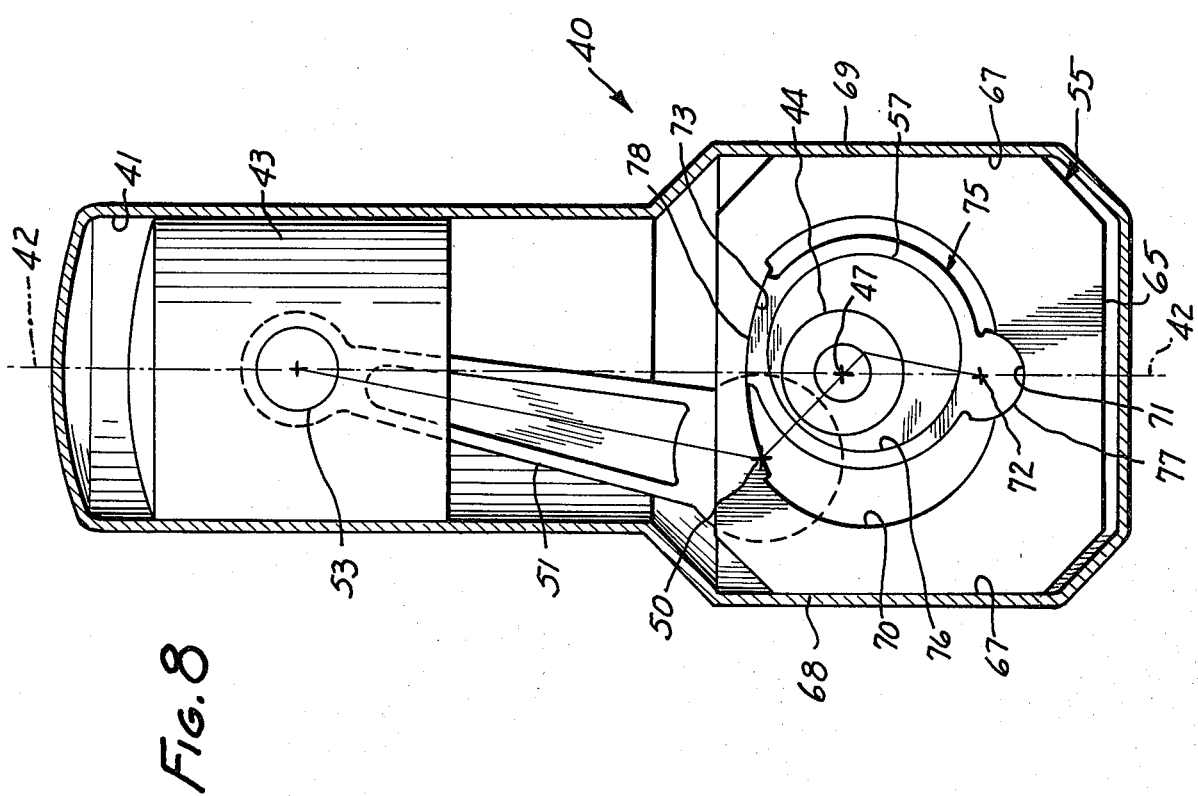

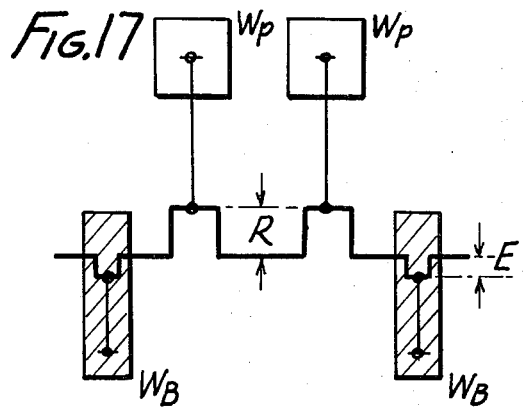
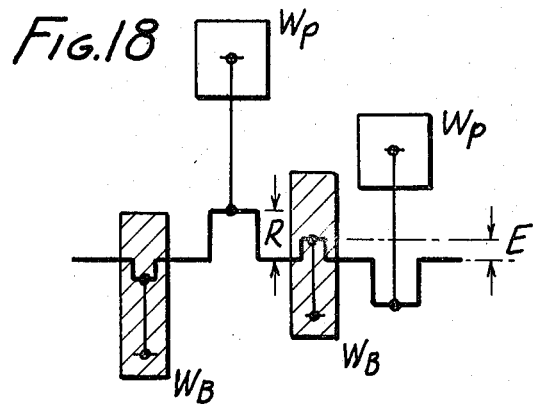
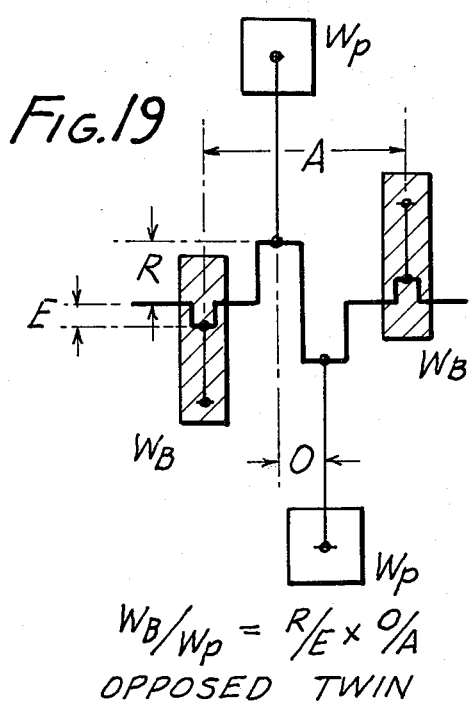
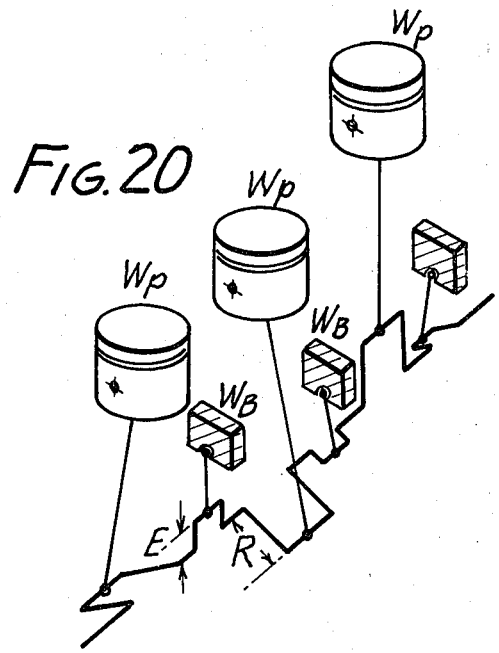
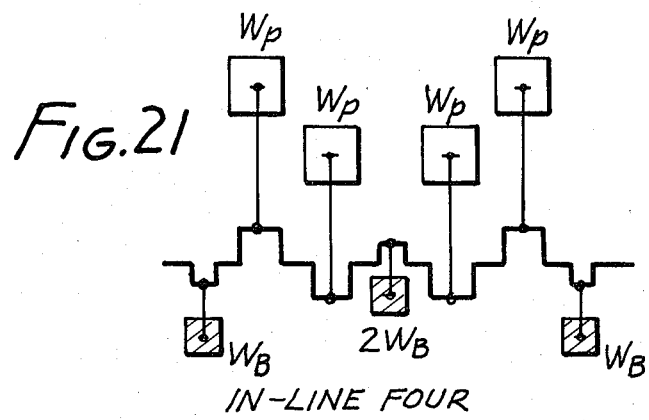

COUNTERWEIGHT SYSTEM FOR POSITIVE DISPLACEMENT PISTON TYPE DEVICE

CROSS-REFERENCE TO OTHER PATENT APPLICATION

This is a continuation of applicant's co-pending U.S. patent application Ser. No. 098,702, filed Nov. 29, 1979, entitled "Counterweight System For Positive Displacement Piston Type Devices" and now abandoned.

FIELD OF THE INVENTION

This invention relates to counter-balancing of piston-type positive displacement devices whose inertial response must be counter-balanced. Examples are internal combustion engines, pumps, and compressors.

BACKGROUND OF THE INVENTION

In piston-type positive displacement devices, an axially movable piston and a rotatable crankshaft are linked by a connecting rod which is journaled to both of them. Then the axial movement of the piston and the rotation of the crankshaft occur simultaneously one naturally being caused by the other. The cyclical reversal of the piston and connecting rod would, if not counterbalanced, create an intolerable and destructive vibration. Simultaneously, the crankpin and the connecting rod undergo movements which are other than purely axial, and these can also give rise to undesirable vibrations. The classical way to reduce these vibrations is to provide counterbalancing which by its motion and inertia provides oppositely directed force which tends to reduce the net vibratory force. Because in all engines, but especially in single-cylinder engines of practical size, it is not possible to duplicate the moving bodies and their reactions to provide precisely equal and opposite counterbalancing forces, many attempts have been made to approach a respectable compromise, but these have always been less than optimal.

In addition, the mountings of the device which are used to attach it to a base have been extensively developed for the purpose of damping the transmission of vibrations to the base.

The existence of the internal combustion engine is testimony to the acceptability of the many trade-offs which have been made to smooth its operation, and of constructions which have been built for that purpose. Still, undesirable vibrations and some engine roughness persist, and many of the existing counterbalancing devices are unsuitably bulky. Especially in small two-cycle engines where engines size must be minimized, conventional counterbalancing constructions continue to add unfavorably to the bulk of the engine. It is a useful and desirable thing to reduce engine bulk, especially when with a reduction, a smaller sized engine could be made which produces the same power for use in propelling a relatively lightweight vehicle as a bulkier engine.

Also, in any engine, it is desirable to reduce the vibration as much as possible in order to subject the engine and its parts to lesser peak stresses. Lighter-weight parts can then be used.

Among the many attempts to provide improved counter-balancing, the following United States patents appear to deserve comment: Ricardo U.S. Pat. No. 1,310,090; Ishida U.S. Pat. No. 3,528,319; Mederer U.S. Pat. No. 2,212,272; Ishido U.S. Pat. No. 3,563,223; Ljungstrom U.S. Pat. No. 2,235,160; Hintze U.S. Pat. No. 4,152,956; Berlyn U.S. Pat. No. 3,112,658; Portman U.S. Pat. No. 4,156,387; Harkness U.S. Pat. No. 3,457,804.

These intelligent efforts attest that the problem is one of long-standing, and each illustrates an attempt to improve matters. The Ricardo and Ljungstrom patents are of especial pertinence to the invention.

Another shortcoming of the internal combustion engine, or of any positive displacement piston type device is inherent in its very nature. It is based on the fact that at top dead center (TDC) and at bottom dead center (BDC), the piston exerts no torque on the crandshaft. This creates a null condition as to torque from the piston at those moments, which unless compensated for can cause roughness in operation. For this reason flywheels and other momemtum-type devices are included. The moment of inertia of such devices is important to their function—the larger the better. However, in small, lightweight engines, heavy flywheels are not tolerable. Then even the moment of inertia of the connecting rod or rods become important, but it is not particularly large. It would be a useful thing to provide the counterweight in such a way as to increase the moment of inertia and thereby to smooth out the operation of the engine near TDC and BDC.

It is an object of this invention to provide an efficient and rugged counterbalancing system which is of lesser bulk than conventional systems, and which provides complete counterbalancing, better and more complete than known system, and which because of the reduction in height which it enables, is especially suited for use in vehicles where small engines are needed, such as mopeds, motorcycles, and snowmobiles.

It is another object of this invention to provide a counterweight in such an arrangement that its moment of inertia relative to the crankshaft is comparatively large, so as to smooth out the engine's operation around TDC and BDC.

This invention is carried out in a positive displacement piston-type device such as a internal combustion engine having at least one piston, a crankshaft with an eccentric crankpin, and a connecting rod interconnecting them. A counterweight is linked to the crankshaft and is axially slidable in a axial guideway and which includes a wagging member which wags as it reciprocates.

According to one embodiment of this invention, the counterweight itself wags.

According to yet another embodiment of the invention, a connecting link wags, and transmits axial force to the reciprocating counterweight, which counterweight does not wag.

The invention will be fully understood from the following detailed description and the accompanying drawings, in which:

FIGS. 1–5 are schematic illustrations of some features of the prior art;

FIG. 6 is a schematic showing of a portion of one of the embodiments of this invention;

FIG. 8 is a transverse cross-section of an engine incorporating the embodiment of FIG. 7;

FIG. 9 is an axial cross-section taken in FIG. 8;

FIGS. 10–12 are schematic illustrations showing other features of the prior art;

FIG. 13 is a schematic illustration showing the theory of another embodiment of the invention;

FIGS. 17–21 are schematic illustrations showing this invention used in various other piston type displacement devices.

Figure 7:
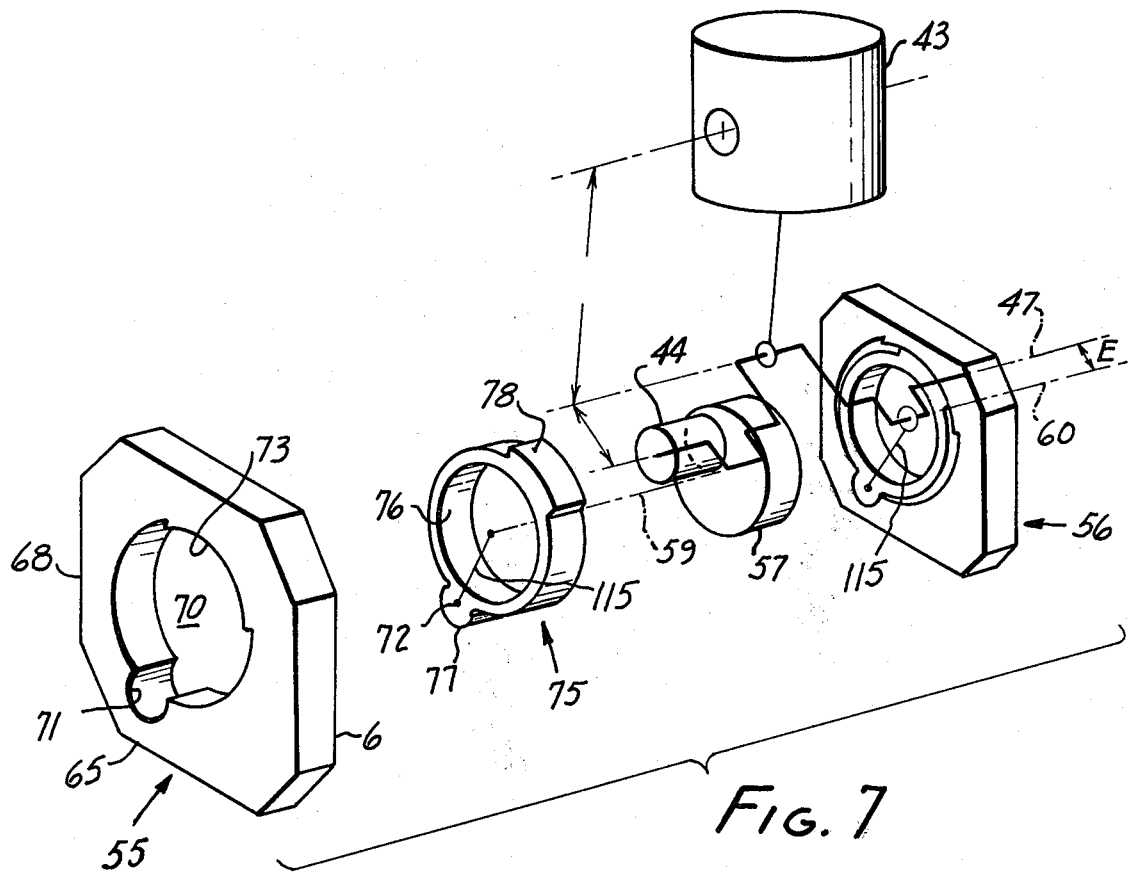
FIG. 7 is a partially schematic, exploded, view of one of the embodiments according to this invention.
Figure 14:
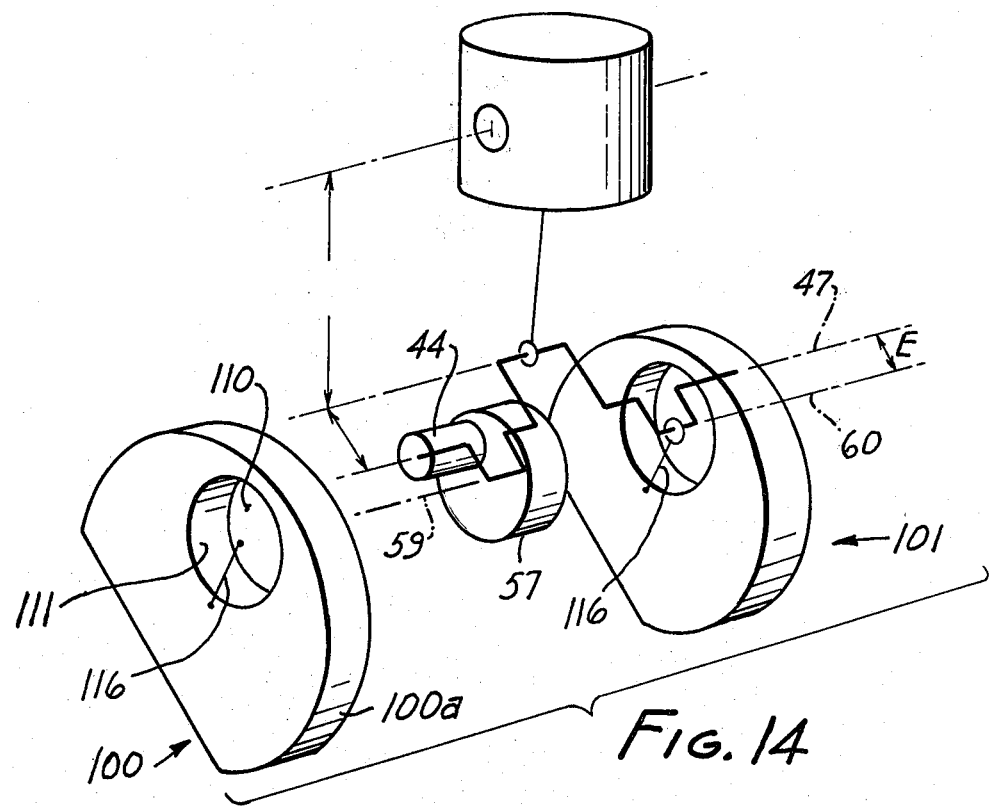
FIG. 14 is a partially schematic, exploded view of an embodiment of the invention utilizing the scheme shown in FIG. 13.
Figure 16:
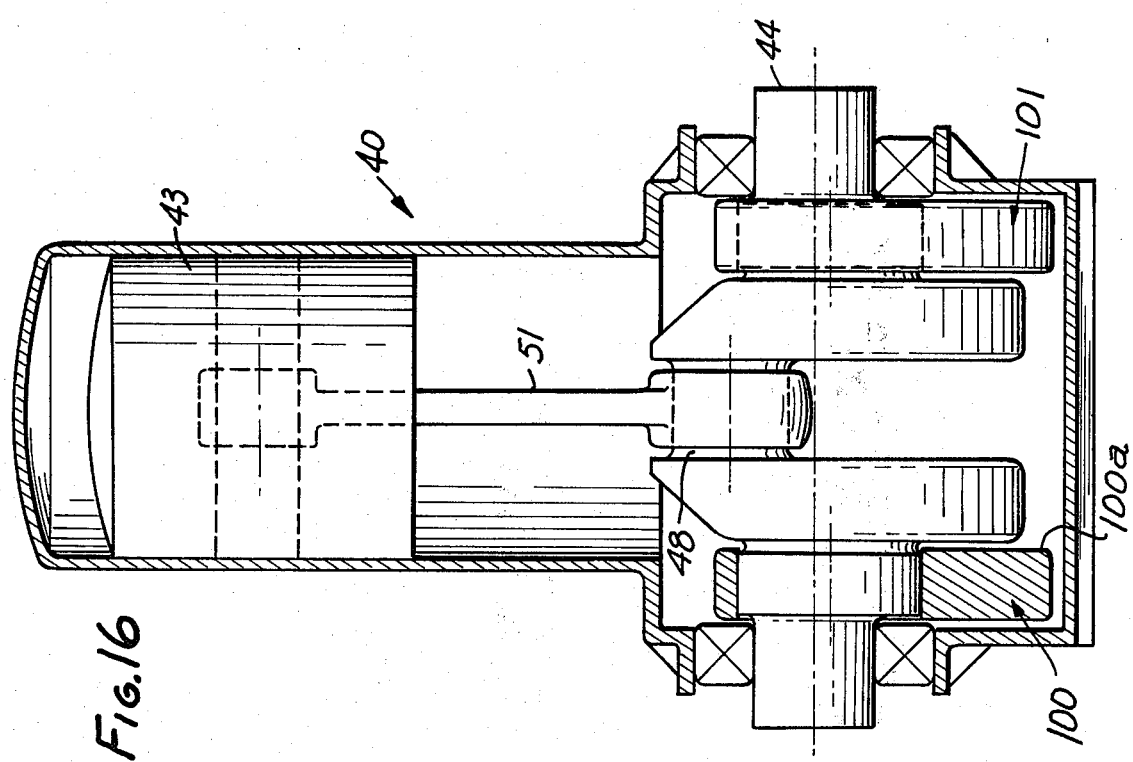
FIG. 16 is an axial view, partly in cross-section taken in FIG. 15.
Figure 15:
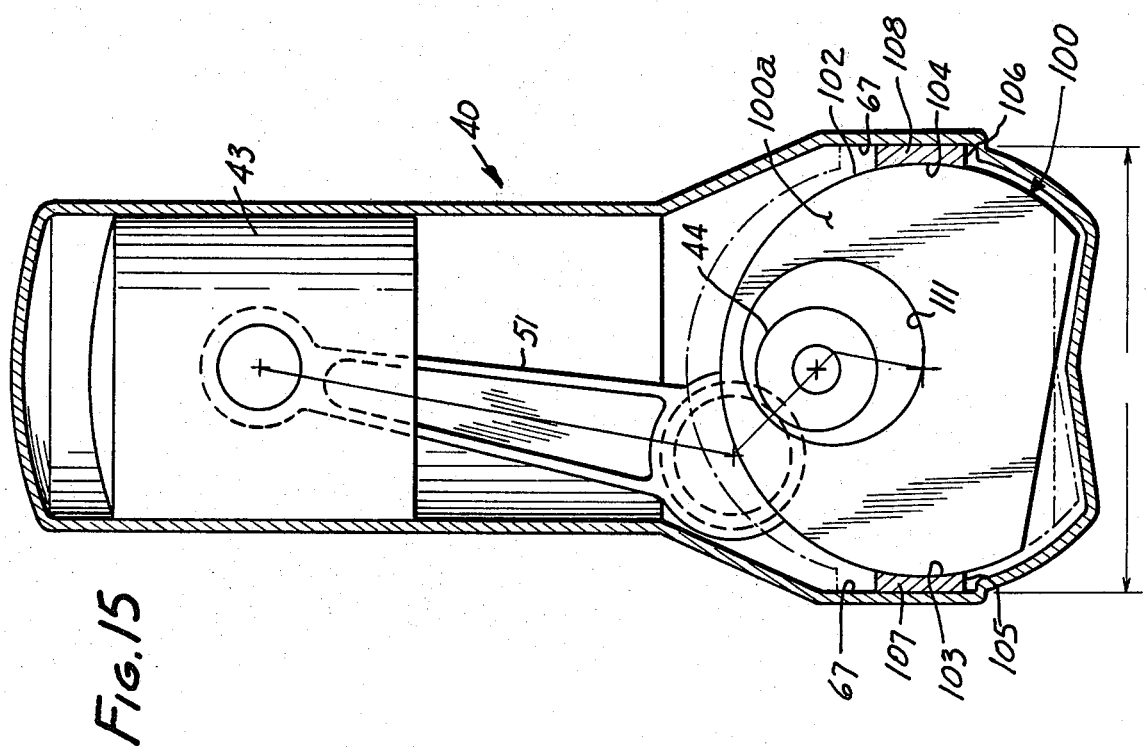
FIG. 15 is a lateral cross-section of an engine incorporating the embodiment of FIG. 14.

FIG. 1 is a schematic showing of the theory of the counterbalancing problem in an internal combustion engine. Only one piston 10 is shown, but persons skilled in the art will recognize that this discussion applies also to multi-cylinder and multi-bank devices, for example those shown in FIGS. 17–21. Piston 10 is connected to an offset throw 11 of a crankshaft 12 by a connecting rod 13. The connecting rod is journaled to the throw and to the piston by bearings, as is well-known. The length of the connecting rod between the bearings is L. Dimension R is the eccentricity of throw 11, i.e., its distance from the central axis 14 of rotation of the crankshaft. Reciprocation of the piston in its cylinder 15 (FIG. 10) causes the crankshaft to rotate around axis 14. This reciprocation creats unbalanced forces, which must be counterbalanced.

The classical techniques for counterbalance is shown in FIGS. 1, 10, 11 and 12. FIG. 1 shows a pair of counterweights 20, 21 mounted in a slideway 22 (FIG. 11) for reciprocation along axis 23 parallel to piston axis 24. They are connected by connecting rods 25, 26 to respective counterweight throws 27, 28. Connecting rod 25 is shown in detail. Rod 26 is identical to it.

Rod 25 has a crank end bearing 27 and a counterweight end bearing 28. The spacing between the center of these bearings is dimension C. The eccentricity of the counterweight throw is dimension E. By increasing the counterweight mass, E can be made smaller than R. With reference to FIG. 1, the following relationship exist:

$$L/R = C/E, \text{ and } R/E = 2W_B/W_P$$

$W_B$ is the total reciprocating mass of the counterweight system, and $W_P$ is the total reciprocating mass of the piston-connecting rod system. In order to achieve perfect balance, these relationships must be established. In practical engines, the aim is to reduce the dimension C, and therefore E so as to achieve a compact engine or other device. The limit on the reduction of C is explained below. This invention overcomes the limitations on the reduction of dimension C (and therefore also of E), so as to enable a perfectly balanced engine of compact structure to be built.

FIG. 12 shows that, instead of using slideways to guide the counterweight, a pivoted linkage comprising a connecting rod 30 journaled to the counterweight throw can be journaled to a counterweight 31, which is supported for arcuate motion by a support 32 which is hinged to case 33 by a hinge 34. This involves the further difficulty of an unbalanced force due to arcuate movement of counterweight 31. Reduction of arcuate movement can be attained only at the unacceptable cost of a longer and therefore heavier support 32, resulting in an unacceptably large and peculiarly shaped engine.

It is evident from FIGS. 1 and 10–12 that the height of an engine can be reduced by reducing the length of the counterweight connecting rods. However, this presents difficult problems, which are schematically disclosed in FIGS. 2–5.

FIG. 2 shows a conventional counterweight connecting rod, such as rod 25. For it to function, it must provide an internal bearing surface for journaling to the crank (bearing 27) and to a structure such as a wrist pin (bearing 28). Bearing 27 usually has a larger diameter than bearing 28, because of the difference in forces which the crank and the pin or the counterweight must withstand.

The length C is what can be shortened by increasing the mass of the counterweight. There is a limit when conventional rods are used, which is shown in FIG. 3, where dimension C is so short that the two bearings 27a, 28b make the closest structurally permissible approach to one another. It is to be understood that the term "conventional" as applied to this rod means one in which the two bearings lie in the same plane.

The impossibility of a closer approach is shown in FIG. 3, where two bearings 27b and 28b are shown overlapping. This is, of course, an absurdity, and illustrates the fact that with a conventional connecting rod, the length C measured from the center of the crank-end bearing (whose radius is R in the drawings) cannot be less than the radius of that bearing, and must be greater. Thus there is a definite limitation on the minimum length C of a connecting rod, and this in turn limits the opportunities to minimize the height of an engine.

One prior art attempt to overcome this limitation has been disclosed in Ljungstrom No. 2,235,160, where his eccentric crank end bearing 35 (FIG. 4) with a radius R is formed inside a counterweight 36 formed with an outer bearing with radius r, which is greater than R, the crankshaft throw bearing. Such an arrangement has the disadvantage that the system has impractical overal dimensions.

In the foregoing, and in what follows, it should be remembered that the center of the eccentric crank-end bearing will orbit around the central axis of the main bearing of the crankshaft, and that movement of the counterweight and therefore of the counterweight-end bearing will be that of guided reciprocation, such as to the left and to the right in FIGS. 2–5, 11 and 12. Bearing in mind the limitations and disadvantages of the prior art a principal objective of this invention will now be understood to be the reduction of engine height created by provisions for counterbalancing means, without adding unduly to the bulk of the engine.

The presently preferred embodiment of the invention, which nicely accomplishes this invention, is shown in FIGS. 6, 7, 8 and 9. An engine crankcase 40 is schematically shown, with a combustion cylinder 41 having a central axis 42. It is fitted with all necessary fuel charge supply, valving and ignition means, none of which are pertinent to this invention, and which are therefore not shown. Piston 43 is reciprocably axially slidable, and sealingly fitted in the cylinder.

A crankshaft 44 is journaled to the crankcase by main bearings 45, 46 so as to rotate around axis 47.

An eccentric throw 48 is formed with a journal 49 with an axis 50 that is offset from axis 47 by the dimension R of FIG. 1. Connecting rod 51 is connected to the throw by bearing 52. It has a bearing (not shown) at its upper end journaled to a wrist pin 53. Reciprocation of the piston will cause rotation of the crankshaft.

Two counterweight means, 55, 56 are shown in FIG. 9. Because these means are identical, only means 55 will be described in detail. However, two eccentric journals 57, 58 are integral with and turned by the crankshaft. Their outer surfaces are circularly cylindrical, or otherwise provided with rotatable bearings, whose central axes 59, 60 orbit around the central axis 47 of the crankshaft when the crankshaft turns. The lateral spacing apart of axes 59 and 60 from central axis 47 will be recognized as dimension E in FIGS. 1, 6, 7, 13 and 14 and is one half the total axial excursion of the counterweight.

Two counterweights 65, 66 are mounted in respective slideways such as slideways 67 for counterweight means 55. These slideways may conveniently be lubricated rails which provide side and sliding support for bearing surfaces 68 and 69.

As best shown in FIG. 7, the counterweight has a central opening 70 which is entirely surrounded by counterweight. This counterweight reciprocates, but it does not nutate.

A first bearing 71 is formed in the wall of the bottom portion of opening 70. This bearing has a center of curvature at point 72.

A second bearing 73 is formed in the wall of the upper portion of opening 70. This bearing also has its center of curvature at point 72. The radius of curvature of bearing 73 is larger than the radius of curvature of bearing 71. Bearing 71 and 73 are centered on vertical axis 42 which intersects axis 47 of the crankshaft main bearings.

A wagging member 75 has an internal bearing surface 76 which rotatably engages eccentric journal 57. It includes an external first bearing 77 with a radius of curvature substantially equal to the radius of curvature of first bearing 71 in the counterweight. It also includes an external second bearing 78 with a radius of curvature substantially equal to the radius of curvature of second bearing 73.

Bearings 71 and 77 make an abutting and sliding engagement with one another. Bearings 73 and 78 make an abutting and sliding engagement with one another. Because they are all centered on point 72, they can transmit axial forces, and also slide to permit nutating movement of the wagging member.

Rotation of the crankshaft causes the eccentric journals to orbit. These cause the wagging member both to nutate and to transmit an axial component of force to the counterweight, which will move it axially for counterbalance purposes. The only dimensions of criticality are the eccentricity E of the eccentric journals and the connecting rod length "C". Obviously there must be some eccentricity, or there will be no counterbalancing forces generated. However, by increasing the mass of the counterweights, the eccentricity can be reduced. This provides a very useful trade-off, because the weight can be increased by widening the counterweight, and the resulting minor increase in engine width is often more tolerable than an increase in height.

FIGS. 13-16 show another embodiment of the invention. It differs from the previous embodiment of FIGS. 6-9 in that its counterweights both wag and move axially. In the previous embodiment a wagging member behaves as a compressive link which couples the eccentric journal to the counterweight, and it is this member which wags. In the former embodiment, the mass which is rotationally accelerated and declerated is reduced compared to the embodiment of FIGS. 13-16, and this may sometimes be advantageous. However, there are also advantages in increasing that portion of the mass which wags, because the movement of inertia is increased, and at around TDC and BDC this has an important momentum effect. The embodiment of FIGS. 13-16 provides this advantage.

The surrounding and coupled engine parts in FIGS. 13-16 are the same as those in FIGS. 7-9, and bear the same numbers. Howevever, counterweight members 100, 101 are different from those in FIGS. 7-9. Because members 100 and 101 are identical to one another, only member 100 will be described in detail.

Counterweight 100a (as counterweight member 100 is referred to in detail in FIGS. 15 and 16) bears an external curved bearing surface 102 which is adapted either to make direct sliding contact with slideways 67 as suggested in FIG. 13, or to make a sliding contact as a consequence of wagging with inner bearing surfaces 103, 104 on slide bearings 105, 106 (sometimes called "slippers"), while the slide bearings make a sliding contact with the slideways 67 by means of their respective surfaces 107, 108.

Counterweight 100a includes an opening 110 which is completely surrounded by counterweight structure. It has an internal circular bearing surface 111 which engages eccentric bearing 57.

Operation of the embodiment of FIGS. 13-16 should be evident from the foregoing. When the crankshaft is turned, the eccentrics orbit, and cause the counterweight members to reciprocate and also to wag. Counterbalancing forces are thereby generated, and the advantages of lower height can be attained.

In the construction of the invention, but especially in the embodiment of FIGS. 13-16 it is necessary practice for the center of wagging motion to be located at the center of gravity of the counterweight system. In effect, this places the center of gravity at the counterweight end of a theoretical connecting rod linkage between the center of the eccentric bearing, and the center of wagging movement. This theoretical link is suggested by line 116 in FIG. 14, and corresponds to C in FIGS. 1 and 13.

FIGS. 17-21 show the application of this invention to various types of positve-displacement piston type devices such as internal combustion engines. The mass of the pistons is shown as $W_P$. The mass of the counterweights is shown as $W_B$. The offset of the connecting rod throw is shown as R, and the offset of the counterweight throw is shown as E. The counterweights are shown by shaded lines in their physical position relative to their point of attachment to the actual or effective counterweight "connecting rod", and to the orbiting bearing on the crankshaft. These schematic showings indicate any embodiment of the invention.

FIG. 17 shows two counterweight means in a parallel twin piston arrangement with a 360° crank. FIG. 18 shows the same combination, but for a 180° crank. FIG. 19 shows the same combination, but in an opposed twin arrangement.

FIGS. 20 and 21 respectively show in-line three and four piston arrangements. FIG. 20 shows that the throws can be aligned otherwise than at 0° and 180° to one another.

For simplicity in disclosure, throughout this specification. The various bearings have been shown as simple function bearings. It is evident that at all points, intermediate bearings such as roller bearings, tapered bearings, ball bearings, or the like, could be interposed. Also, the guidance of the counterweight members has been shown both as a direct function bearing relationship, and as one which also includes a slipper. Clearly, roller bearings, ball bearing, or the like could readily be interposed between the slideways and the counterweights. Thus, whenever bearing relationships are disclosed or claimed, there is no limitation to any type of bearing, or implied limitation of surface-to-surface contact of any two bearing-relationship related surfaces.

This invention has been disclosed in single bank structures. It is evident that it is just as useful in multiple bank devices, and that its provisions can be multiplied or reduced in a single bank to provide as many counterweight means as may be necessary for each piston, and for any number of pistons, in a single bank, or in multiple banks.

Especially in the embodiment of FIGS. 13–16, the moment of inertia of the counterweight member around its center of gravity can be substantial. At the times near TDC and BDC, its wagging movement is at its most rapid. Therefore this motion provides an increased momentum to the total system at these times which tends to smooth out the operation of the invention. The embodiment of FIG. 7 provides some of this benefit, but not as much as that in the embodiment of FIGS. 13–16.

As a consequence of the foregoing constructions, the counterweight can conveniently surround the eccentric journal and extend axially on both sides of it. Its mass can be brought into an envelope of minimal height, and the engine can be optimally balanced and its operation smoothed at TDC and BDC. The system is simple to construct and is reliable in operation.

The dimensions for the elements of this system are a function of mass and velocity. They are readily calculated by persons skilled in the art. The attempt, of course, is to simulate as closely as possible the unbalanced forces of the crankshaft and piston, and classical techniques of static and dynamic balance will be used to determine the various dimensions.

This invention is not to be limited by the embodiments shown in the drawings and described in the description, which are given by way of example and not of limitation, but only in accordance with the scope of the appended claims.

I claim:

1. A counterweight system for a positive displacement piston type device, said device including a cylinder having an axis, a piston slidably mounted in said cylinder for axial reciprocation therein along said cylinder axis, a crankshaft having an axis of rotation normal to said cylinder axis, a crankthrow laterally spaced from said axis of rotation, and a connecting rod joined by bearings to said piston and crankthrow, said counterweight system comprising:

a slideway having a slideway axis normal to said crankshaft axis and parallel to said cylinder axis;

an eccentric journal on said crankshaft offset from said crankshaft axis so as to orbit around said crankshaft axis when the crankshaft is turned, said eccentric journal having a journal axis parallel to and spaced from the crankshaft axis;

a counterweight slidably mounted in said slideway for axial reciprocation therein along a path parallel to said cylinder axis;

bearing means on said counterweight having an established center of rotation relative to said counterweight, said bearing means being fully engaged to said eccentric journal whereby said journal rotates around said center of rotation of said bearing means;

said counterweight being free for wagging oscillatory arcuate motion laterally relative to said slideway axis in a plane normal to said journal axis, said counterweight having a center of gravity which is also the center of rotation of its wagging motion, said center of gravity being offset from said crankshaft axis, and from said center of rotation of said bearing means, whereby reciprocation of said piston turns said crankshaft, which in turn causes said eccentric journal to orbit and cause said bearing means also to orbit, said slideway constraining translational movement of said counterweight to that which is parallel to said slideway axis, said center of gravity moving along a straight line parallel to said cylinder axis.

2. A counterweight system according to claim 1 in which the counterweight itself is free to make said wagging oscillatory motion around a center of oscillatory motion located along an axis parallel to said slideway axis, and in which said bearing means mounted to said eccentric journal has a center spaced from said center of oscillatory motion, whereby rotation of said crankshaft causes the counterweight itself to move both axially and waggingly.

3. A counterweight system according to claim 2 in which said slideway includes a pair of spaced-apart guides, and in which said counterweight includes a pair of oppositely facing curved slide bearings engaged by respective said guides, said guides serving to constrain translational movement of the counterweight, but to permit it to wag.

4. A counterweight system according to claim 3 in which said slide bearing is curved, its radius of curvature being equal to about one-half the spacing between said guides.

5. A counterweight system according to claim 2 in which said bearing means mounted to said eccentric journal is a circular bearing carried by said counterweight.

6. A counterweight system according to claim 2 in which the center of gravity of the counterweight system is at the center of rotation of said counterweight member.

7. A counterweight system according to claim 1 in which there is provided a plurality of pistons and a plurality of said counterweight systems.

8. A counterweight system according to claim 7 in which the number of counterweight systems equals the number of pistons.

9. A counterweight system according to claim 7 in which the number of pistons exceeds the number of counterweights, some of the counterweights having a greater mass than others of the counterweights.

* * * * *